May 2, 1961 A. M. LE LAN 2,982,259

SAFETY CONTROL MECHANISM FOR MACHINE TOOLS

Filed May 19, 1958

United States Patent Office 2,982,259
Patented May 2, 1961

2,982,259

SAFETY CONTROL MECHANISM FOR MACHINE TOOLS

Armand Marcel Le Lan, Vanves, France, assignor to H. Ernault-Batignolles S.A., Paris, France, a company of France Filed May 19, 1958, Ser. No. 736,225

Claims priority, application France May 20, 1957

5 Claims. (Cl. 121—45)

This invention relates to a device for controlling the movements of a reciprocable member such as a machine-tool carriage adapted to be driven by a servo-mechanism.

In many machines, and in particular in machine-tools comprising a reciprocable member which is to be successively stopped at pre-determined positions along its forward path, there are often used a plurality of abutments carried on a movable support which is periodically operated to successively make the said abutments operative and which is operatively connected with a control member which, whenever the reciprocable member strikes one of the abutments, is brought into a position which causes stopping of the forward movement of said reciprocable member.

On the other hand, whenever the movable support is being operated to set a new abutment into operative position, the said control member must be so actuated that the reciprocable member can resume its forward motion.

In the case when the forward motion takes place at a comparatively high speed or when the distance between two successive abutments is comparatively small, it may happen that the reciprocable member strikes an abutment while the same is still moving towards its operative position which causes jamming. It may even happen that the reciprocable member has already passed a stopping position as the relevant abutment arrives, so that the reciprocable member actually "miss" a stop which may give rise to serious consequences. This invention relates to a machine of the type, for example, disclosed in applicant's copending application Serial No. 736,224 filed May 19, 1958.

An object of the invention is to provide a control device of the type described provided with a safety mechanism capable of positively preventing the reciprocable machine member from "missing" an abutment or even from striking the same before the proper time.

Another object of the invention is to provide a device of this kind, wherein the said safety mechanism brings and holds the control member acting on the servo-mechanism in a position in which it causes a temporary backward movement of the reciprocable machine member during the whole time required for substituting a new abutment to the preceding one.

With this arrangement, when the reciprocable member rests against a given abutment, as soon as the latter begins to move away in order to be replaced by the next one along the path of the reciprocable member, the latter begins to move back until the new abutment has reached its operative position. Thus, the abutment which is moved away does not exert any objectionable friction against the reciprocable member.

Moreover, the latter is prevented from coming into contact with the new abutment as long as the latter has not been correctly set into operative position, and last but not least, if the abutments are but closely spaced, the reciprocable member cannot possibly advance beyond the position of the new abutment, however long may be the time required to interpose the said abutment in the path of the reciprocable member.

A more particular object of the invention is to provide a control device of the type described, wherein the reciprocable machine member is actuated by a hydraulic servo-control.

Other objects and advantages of the invention will be apparent from the following detailed description, together with the accompanying drawings submitted for purpose of illustration only and not intended to limit the scope of the invention, reference being had for that purpose to the sub-joined claims.

Figure 1:
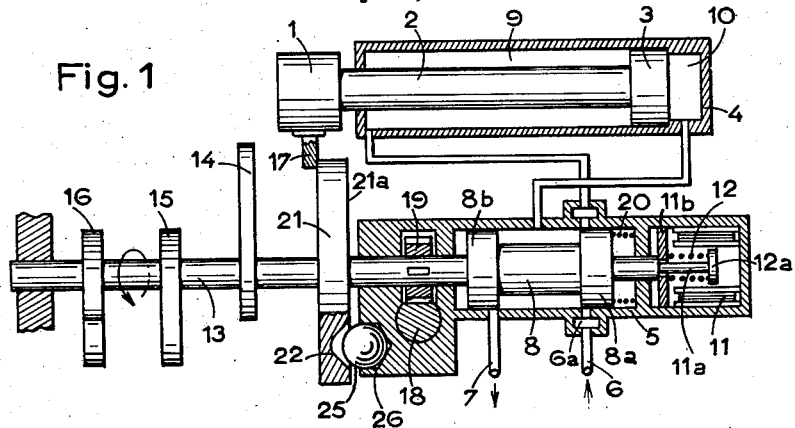
Fig. 1 is a longitudianal section of a hydraulic drive controlled by abutments, according to the invention, in its rest position.

As represented in Fig. 1, a movable member or machine coupling member 1 is rigid with a rod 2 of a piston 3 adapted to be reciprocated in a cylinder 4. This cylinder is fed with pressure fluid, on either side of the piston 3 through a distributor 5 which is connected to a source of pressure fluid and to the tank (not shown) through pipes 6 and 7, respectively. It is understood that a machine tool carriage may be coupled to the movable member 1 or for that matter any other reciprocable member of a machine tool may be coupled to movable member 1 which is coupled to the rod 2 for reciprocation therewith in such a manner that reciprocation of member 1 with rod 2 and piston 3 will reciprocate the aforesaid member 1 or any other reciprocable member.

The distributor 5 comprises a sliding valve 8 with two shoulders 8a and 8b.

The sliding valve 8 is formed with an extension or rod 11a which is coupled to a selector or electromagnetic device comprising a movable plate 11b associated with an electromagnet 11; movable plate 11b is freely threaded over rod 11a. A spring 12 bears against a head 12a of the rod 11a and against the plate 11b.

An annular chamber 6a surrounding the distributor 5 ensures a permanent supply of pressure fluid to the chamber 9 located ahead of the piston 3, i.e. on the left hand side of said piston in Fig. 1.

Figures 2, 3:
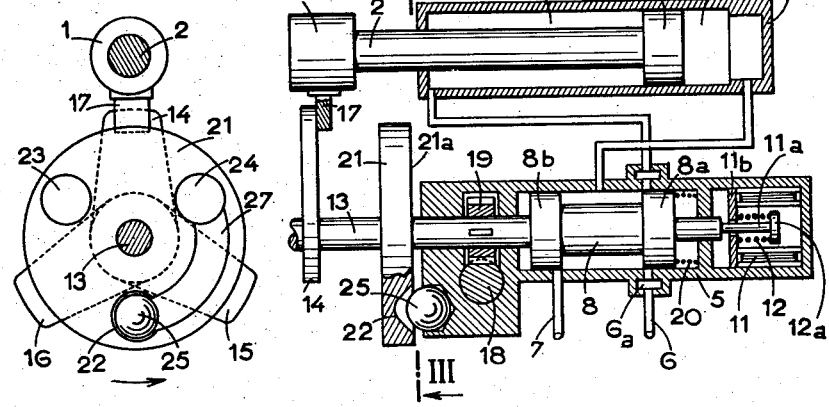
Fig. 2 shows a portion of the hydraulic drive of Fig. 1 stopped against an abutment after a predetermined length of travel of the movable member.
Fig. 3 is a cross-sectional view made on line III—III of Fig. 2.

When pressure fluid is fed also to the chamber 10 located behind the piston 3, i.e. on the right hand side of this piston in Figs. 1 and 2, said piston is moved toward the left because the pressure of the fluid presses upon the piston 3 in the chamber 10 over an area larger than the area in the chamber 9. The piston 3 operates as a differential piston one face of which, namely the smaller, is permanently subjected to the pressure fluid whereas the other face thereof is either subjected to the pressure fluid or not.

Upon the electromagnet 11 being energized the plate 11b is attracted and moved toward the right together with the sliding valve 8. The chamber 10 is then fed with pressure fluid and the piston 3 moved toward the left.

Under different conditions, if it is assumed that the sliding valve 8 is moved toward the left (for instance from the position shown in Fig. 2), the chamber 10 gets connected to the tank and the piston 3 moves rearwardly.

The sliding valve 8 is rigid with a rotary spindle 13 on which are secured the selective abutments according to the invention which in the example shown are constituted by dogs 14, 15, 16 adapted to cooperate with a finger 17 secured to the movable member 1. These dogs are successively set into operative position through angular motions of the spindle 13 always effected in the same rotational direction from a rack 18 in mesh with a pinion 19 mounted on the spindle 13 through a one-way driving device of any suitable known type such as a ratchet mechanism (not shown).

A spring 20 inserted between one end of the distributor 5 and the sliding valve 8 urges the latter forwardly with a restoring force weaker than that of the spring 12.

It will be understood that, while the movable member 1 is moving forwardly, the engagement of the finger 17 with a dog, the dog 14 for instance, causes the spindle 13 and, consequently, also the sliding valve 8 to move forwardly, thus tensioning the spring 12; the shoulder 8a of the sliding valve cuts out the fluid supply to the chamber 10 of the cylinder 4 and the movable member 1 stops (Fig. 2).

Subsequent to an angular indexing movement of the spindle 13 for bringing the next dog, e.g. dog 15, into active position, the sliding valve 8, under the action of the spring 12, is restored to the position which corresponds to the chamber 10 behind the piston being again fed, whereby the movable member 1 resumes its forward movement.

In the course of this movement there is the risk that the movable member 1 will pass the position for which the finger 17 is supposed to engage the dog 15 if the latter has not yet reached its angular position required for properly cooperating with the finger.

In order to preclude the serious inconveniences which would result therefrom, the device for ensuring the successive advancing movements by means of dogs as hereinabove described and known per se, comprises a safety mechanism adapted to prevent any undesirable advancing movement from occuring.

Furthermore, the control device is so designed that even when the sliding valve 8 is urged by the electromagnet to its forward movement controlling position, it may be temporarily brought by the safety mechanism, not only to its neutral position, but beyond said position, i.e. it may be urged to its backward movement controlling position. The safety mechanism 21, 25 is adapted to shift valve 8 from a neutral position to a return stroke position upon the adjustment of the abutments 15 or 16 into operative position in which they are in alignment with the stop member 17. The slide valve 8 is movable between three positions, namely a central "stop" or neutral position, a right hand "forward drive" or advance stroke position and a left hand "backward drive" or return stroke position. In the "stop" or neutral position as shown in Figs. 1 and 2, it will be noted that there is no communication between chamber 10 of cylinder 4 and the source of pressure fluid through pipe 6, on the one hand, and between chamber 10 and the exhaust of pressure fluid to the tank through pipe 7, on the other hand the flow of pressure fluid to or from chamber 10 from pipe 6 or to pipe 7, respectively, is interrupted when valve 8 is positioned in its "stop" or neutral position. In the right hand "forward drive" or advance stroke position, see Fig. 3, chamber 10 is in communication solely with the source of pressure fluid which is received through pipe 6, and shoulder 8b is effective to seal off the return to the tank through pipe 7. In the left hand "backward drive" or return stroke position the chamber 10 is in communication solely with the exhaust of pressure fluid to the tank through pipe 7, and shoulder 8a is effective to seal off the intake of pressure fluid from the source through pipe 6.

This safety mechanism comprises a plate 21 rigidly secured onto the spindle 13 and bearing, in the position represented in Fig. 1, under the action of the spring 20 against the rear face of the finger 17. The rear face of the plate 21 is formed with recesses 22, 23 and 24 angularly spaced in correspondence with the dogs 14, 15 and 16 and forming cams adapted to cooperate with a ball 25 housed in a blind hole 26 provided in the stationary body of the distributor. The recesses 22, 23 and 24 are respectively in engagement with the ball 25 when the dogs 16, 14 and 15 are successively in active position.

The recesses have a cross outline such that in the angular positions of the spindle 13 in which a dog is properly positioned, they allow through energization of the electromagnet 11, the sliding valve 8 to be shifted toward the right under the action of the spring 12 in order to initiate the advancing movement of the movable member 1.

Figure 4:
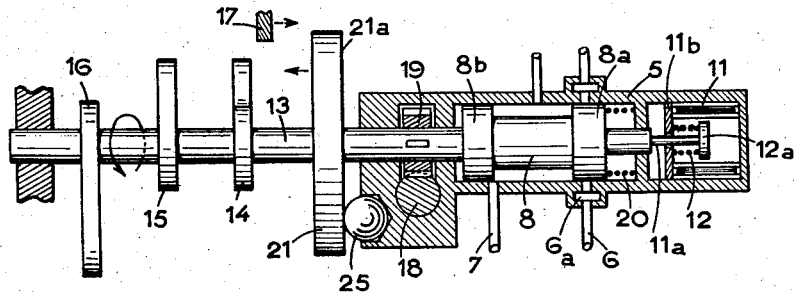
Fig. 4 is a view similar to that of Figs. 1 and 2 in the course of the abutment indexing step.

On the contrary, as the spindle 13 is rotated for putting the next dog into operative position, for instance the dog 15, the corresponding recess 22 (Fig. 3) is no longer in register with the ball 25 and the plate 21 effects an axial movement forwardly (Fig. 4) while bearing against the ball 25 by its rear face 21a and drives the sliding valve 8, the shoulder 8b of which does not prevent any longer the chamber 10 from communicating with the tank. It results therefrom that the piston 3 and, consequently, the movable member 1 recedes until the moment when the next recess 23 is facing the ball 25 and lets the sliding valve 8 urged by the spring 12 resume its position in which the piston 3 is driven forwardly. The finger 17 then engages the dog 15 which is thus moved to the required position.

Thus, in the course of each angular movement of the spindle 13 intended to bring a dog in operative position after the use of the first dog, the movable member 1 temporarily moves backwardly and is unable to resume its forward movement until the new dog is set in correct position. Preferably, the device is so designed that this temporary backward movement of the movable member is effected at a slow speed. This may be obtained by proper relative axial positioning of the ball 25 and the recesses 22, for providing only a short axial movement of the sliding valve 8 from neutral to backward controlling position.

It should be noted that, after the last dog (16 in the example illustrated) has been used the movable member 1 is brought back to its original position (Fig. 1) and that, therefore, the finger 17 is in engagement with the fore face of the plate 21. Under these conditions, if it were desired at this moment to index the dogs, i.e. bring the first dog 14 into active position and if no particular means were purposely provided, such indexing movement would be impossible, because the corresponding angular movement of the plate 21 combined with the action of the ball 25 will tend to urge said plate axially toward the left in the drawing now, this axial movement is prevented by the finger 17 then in engagement with the plate 21. This is the reason why, in the embodiment represented, an arcuate furrow 27 is cut into the face 21a of the plate 21 between the recesses 22 and 23 in order to allow the spindle 13 to rotate without axial movement while preventing any undesirable advancing movement which would result from energization of the electromagnet prior to the correct angular positioning of the dog 14, the depth of the furrow 27 being such that the shoulders 8a and 8b respectively, obturate the orifices of the pipes 6 and 7.

It would be furthermore noted that setting the dog 14 into active position may be carried out prior to energizing the electromagnet 11 which controls the advancing movement of the movable member and the deenergization of which has caused the movable member to be restored to its original position under the action of the spring 20 (Fig. 1). There is, therefore, no inconvenience in making the safety device idle in the course of the period during which the first dog is substituted for the last one.

Of course, the safety mechanism described hereinabove might be modified or completed with any useful auxiliary member without the scope of the invention, as defined by the appended claims, being departed from.

While there has been described what is at present considered to be the preferred embodiment of this invention, it will be obvious to those skilled in the art that various changes and modifications may be made therein without departing from the scope of the invention.

What I claim is:

1. A valve control system for a hydraulically operated reciprocable member having a determinable starting position, said system comprising a valve member, resilient means engaging and urging said valve member towards a predetermined position, valve member shifting means to displace said valve member against the action of said resilient means, means to provide an advance stroke of said reciprocable member, said valve member being operatively associated with and controlling the latter said means, a stop on said reciprocable member, a valve actuating member on said valve member, a plurality of abutment means on said valve actuating member and operatively disposed to engage said stop selectively, adjusting means on said actuating member to bring said abutment means selectively into registration with said stop for engagement with the same, and return means on said actuating structure to return said reciprocating member to said starting position whereby the abutment means can be selectively registered with said stop for successive operations.

2. A system as claimed in claim 1 wherein said actuating means is rigidly coupled to said valve member and said abutment means are rigidly fixed on said actuating means, said actuating and abutment means being displaceable in a direction parallel to that of said reciprocable member.

3. A system as claimed in claim 1 wherein said actuating means includes a shaft and said abutment means are members extending radially from the shaft at angularly displaced positions.

4. A system as claimed in claim 3, wherein said return means includes a member fixed on said shaft, said adjustment means comprising cam means operatively engaged with the latter said member to control registration of said abutment means.

5. A system as claimed in claim 1 comprising a distributor cylinder having an axis parallel to the movement of said reciprocable member and accommodating said valve member, said cylinder having an outlet selectively coupled by action of said valve member to said means to provide the advance stroke.

References Cited in the file of this patent

UNITED STATES PATENTS

| | | |
|---|---|---|
| 2,139,981 | Sugihara | Dec. 31, 1938 |
| 2,343,661 | Glass | Mar. 7, 1944 |
| 2,368,017 | Grad | June 23, 1945 |
| 2,505,224 | Whitcomb | Apr. 25, 1950 |
| 2,543,759 | Cannon et al. | Mar. 6, 1951 |
| 2,568,450 | Hjarpe | Sept. 18, 1951 |
| 2,830,561 | Lindstrom | Apr. 15, 1958 |
| 2,837,059 | Tomka | June 3, 1958 |